(12) United States Patent  
Yamazaki et al.

(10) Patent No.: US 8,568,547 B2  
(45) Date of Patent: Oct. 29, 2013

(54) MOLDED PRODUCT AND MANUFACTURING METHOD THEREOF

(75) Inventors: Takanori Yamazaki, Mito (JP); Naofumi Chiwata, Mito (JP); Takenori Taki, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 381 days.

(21) Appl. No.: 12/768,794

(22) Filed: Apr. 28, 2010

(65) Prior Publication Data

US 2010/0206468 A1    Aug. 19, 2010

Related U.S. Application Data

(62) Division of application No. 11/497,338, filed on Aug. 2, 2006, now abandoned.

(30) Foreign Application Priority Data

Aug. 2, 2005 (JP) ................................. 2005-224244

(51) Int. Cl.  
*B32B 37/06* (2006.01)

(52) U.S. Cl.  
USPC .............. 156/221; 156/222; 156/242; 428/76

(58) Field of Classification Search  
None  
See application file for complete search history.

(56) References Cited

U.S. PATENT DOCUMENTS

| | | | |
|---|---|---|---|
| 3,346,789 A | 10/1967 | Robinson | |
| 3,550,269 A | 12/1970 | Kanda et al. | |
| 4,133,101 A | 1/1979 | Glover | |
| 6,031,277 A | 2/2000 | Sugiura et al. | |
| 6,059,983 A | 5/2000 | Noble | |
| 6,572,723 B1 | 6/2003 | Tilton | |
| 2004/0185237 A1* | 9/2004 | Kawate | 428/216 |

FOREIGN PATENT DOCUMENTS

| | | |
|---|---|---|
| JP | 10-214521 | 8/1998 |
| JP | 2000-114295 | 4/2000 |
| JP | 2000-149667 | 5/2000 |
| JP | 2000-294040 | 10/2000 |
| JP | 2002-288613 | 10/2002 |
| JP | 2002-337164 | 11/2002 |
| JP | 2003-143868 | 5/2003 |
| JP | 2004-501803 | 1/2004 |
| WO | WO 02/02302 | 1/2002 |

* cited by examiner

*Primary Examiner* — Monique Jackson  
(74) *Attorney, Agent, or Firm* — Antonelli, Terry, Stout & Kraus, LLP.

(57) ABSTRACT

A molded product and a method of manufacturing the same are disclosed, in which the insulating layer of uniform thickness is formed in a narrow clearance between plural metal bodies. Surroundings of metal plates spaced at specified intervals are covered with insulating polymer to insulate them electrically. A spacer polymer which consists of insulating polymer whose melting point is T1 is arranged between the metal plates, and a molded part which consists of insulating polymer whose melting point is T2 (<T1) covers surroundings of the metal plates and the spacer polymer.

5 Claims, 6 Drawing Sheets

PRIOR ART (a)  (b)  (c)

MOLDED PRODUCT AND MANUFACTURING METHOD THEREOF

CROSS-REFERENCE TO RELATED APPLICATION

This application is a divisional application of U.S. application Ser. No. 11/497,338, filed Aug. 2, 2006 now abandoned, the contents of which are incorporated herein by reference.

BACKGROUND OF THE INVENTION

The present invention relates to a molded product and a method of manufacturing the same, in which surroundings of each of metal bodies spaced at a constant interval is covered with insulating polymer to insulate plural metal plates electrically.

The technique by which metal bodies are covered with a molded part comprised of insulating polymer is generally used to secure the reliability over the long term when insulating between metal bodies of relatively high average electric field strength of hundreds of V/mm or more with insulating polymer. As a technique by which the molding coating is done, the technique by which insulating polymer is injection-molded or extrusion-molded to obtain a target shape with the part to be exposed of metal bodies held is most frequently used.

As shown in FIG. 10A, two metal plates 101, 102 which have plural terminal parts 101a, 102a are coated with molded part 103 in usual molded product 100. Terminal parts 101a and 102a of metal bodies 101, 102 can be exposed from molded part 103. As shown in FIG. 10B and FIG. 10C, metal bodies 101, 102 are spaced at specified intervals and insulated to each other.

Metal bodies 101, 102 are set in cavity 113 of injection molding die 110 as shown in FIG. 11, and fixed in cavity 113 with terminal part 101a, 102a placed between upper dies 111 and lower dies 112. Afterwards, molten resin 116 is supplied to cavity 113 from at least one shooting head 115 connected fluidly thereto. After the supply of molten resin 116 is completed, molded part 103 is formed by cooling molten resin 116 to solidify, and molded product 100 shown in FIG. 10 is obtained.

The prior art described above is disclosed, for example, in Japanese Patent Application Laid-Open No. 2003-143868.

SUMMARY OF THE INVENTION

There are three main problems when the insulative molded product described above is molded by injection molding.

(a) When the resin with a high melt viscosity is used, or when the areas of metal plates 101, 102 are large, it is difficult to decrease the clearance 105 (insulation thickness) between the metal bodies.

When clearance 105 between metal bodies 101, 102 becomes narrow to the areas of metal bodies 101, 102, the injection molding material (molten resin 116) becomes hard to enter between metal bodies 101, 102. Therefore, it is difficult to form an insulating layer not defective between metal bodies 101, 102. Although nylon which has small viscosity at melting is used to perform the injection molding with a high degree of accuracy, the clearance 105 where desirable injection molding can be performed to metal bodies 101, 102, one side length of which is about 200 mm is about 0.5 mm. Molten resin 116 does not spread to the edge of cavity 113 (every corner) when clearance 105 is smaller than the value. Therefore, problem may occur in such a case. Inflow shortage of such a material causes the decrease in the insulating property between metal bodies 101, 102.

(b) It is difficult to maintain clearance 105 between metal plates 101, 102 uniformly.

It is difficult to hold metal bodies 101, 102 when tried to insulate relatively thin metal plates 101, 102 spaced at specified intervals, and cover the outside of metal bodies 101, 102 with molded part 103. As a result, metal bodies 101, 102 are transformed by the pressure of injected molten resin 116, and the homogeneity of clearance 105 is lost. When the homogeneity of clearance 105 is lost, the electric field concentrates on the part with a narrow interval, the defect part of the insulation structure when the voltage is applied to metal bodies 101, 102. As a result, long-term reliability of the article is spoiled (c) It is difficult to make insulating material (insulating polymer) and metal bodies 101, 102 stick.

Although surroundings of metal plates 101, 102 or clearance 105 between them becomes a part on which the electric field concentrates when the voltage is applied to metal bodies 101, 102, the insulation performance decreases when flaking off is caused on the interfaces of metal bodies 101, 102 and the insulating material by the heating and cooling repeated by the change of the turn-on environment (or, system requirements) or by "shrinkage" when the insulating material is molded, and the possibility that the dielectric breakdown is caused rises. A partial electric discharge may occur on the interface of metal bodies 101, 102 and the insulating material, and lifetime may be remarkably decreased. Therefore, it is necessary to bond insulating material and metal bodies 101, 102 strongly, and mold release characteristics deteriorate when the insulating material contains the adhesive. In addition, the viscosity of molten resin 116 rises, and the formability deteriorates. Further, there is a possibility that the adhesive flows by the injection pressure of the insulating material when the adhesive is spread on metal bodies 101, 102 beforehand, and the bonding power varies.

In consideration of the above-mentioned circumstances, an object of the present invention is to provide a molded product and a method of manufacturing the same, in which the insulating layer of uniform thickness is formed in a narrow clearance between plural metal bodies.

To achieve the above-mentioned object, the present invention in one aspect resides in a molded product, in which surroundings of metal plates spaced at specified intervals are covered with insulating polymer to insulate them electrically comprises a spacer polymer arranged between said metal plates, which consists of insulating polymer whose melting point is T1, and a molded part, which covers surroundings of said metal plates and said spacer polymer, and consists of insulating polymer whose melting point is T2 (<T1).

Preferably, the principal ingredient of said insulating polymer of melting point T1 is aromatic polymer, and the principal ingredient of said insulating polymer of melting point T2 is polyolefine.

Optionally, the bonding layer composed of the adhesive that melting point T3 is in the relation of T3<T1 is provided between said metal plates and said spacer polymer, and between said metal plates and said molded part. Preferably, the first and second bonding layers composed of the adhesive that melting point T3 is in the relation of T3<T1 are provided between said metal plates and said spacer polymer, and between said metal plates and said molded part, respectively, and each adhesive which composes said first and second bonding layers has high compatibility.

In another aspect, the present invention resides in a method of manufacturing a molded product, in which surroundings of metal plates spaced at specified intervals are covered with insulating polymer to insulate them electrically, comprises the steps of arranging a first sheet material composed of insulating polymer whose melting point is T1 between said metal plates spaced at specified intervals, arranging a second sheet material composed of insulating polymer whose melting point is T2 (<T1) outside of the outermost metal plates, hot-pressing molding a laminate of the metal plates, the first sheet material, and the second sheet material at a temperature higher than T2 but lower than T1, melting the second sheet material while securing the interval between the metal plates by the first sheet material, and covering the surroundings of the metal plates and the first sheet material with the molded part composed of insulating polymer whose melting point is T2.

In a further aspect, the present invention resides in a method of manufacturing a molded product, in which surroundings of metal plates spaced at specified intervals are covered with insulating polymer to insulate them electrically, comprises the steps of arranging a first sheet material composed of insulating polymer whose melting point is T1 between said metal plates spaced at specified intervals, arranging a laminate of the metal plates and the first sheet material in the cavity of the injection mold, injecting insulating polymer whose melting point is T2 (<T1) heated and melted at a temperature higher than T2 but lower than T1 into the cavity, and covering the surroundings of the metal plates and the first sheet material with the molded part composed of insulating polymer whose melting point is T2 while securing the interval between the metal plates by the first sheet material.

Optionally, a plurality of said first sheet materials are arranged between the metal plates.

Optionally, the method of manufacturing a molded product further comprises the steps of providing as one first bonding layers and second bonding layers which consist of adhesive whose melting point T3 is in the relation of T3<T1 on surfaces of the first sheet material and surfaces on the metal body sides of the second sheet materials, respectively, and after hot-pressing molding, bonding the first sheet material to said metal plates by the first bonding layers, and said molded part to said metal plates by the second bonding layers. Preferably, in the method of manufacturing a molded product, each adhesive which composes the first bonding layer and the second bonding layer has compatibility, and the first bonding layer are bonded to the second bonding layer.

Optionally, the method of manufacturing a molded product further comprises the steps of providing as one first bonding layers which consist of adhesive whose melting point T3 is in the relation of T3<T1 on surfaces of the first sheet material, and after hot-pressing molding, bonding the first sheet material to said metal plates by the first bonding layers.

Plural metal plates can be coated with insulating polymer according to the present invention. Moreover, it is possible to insulate between plural metal plates by a thin and uniform insulating layer.

BRIEF DESCRIPTION OF THE DRAWINGS

FIG. 3A is a plan view, and FIG. 3B is a sectional view taken along the line 3B-3B of FIG. 3A.

FIG. 8A is a plan view, and FIG. 8B is a view seen from a direction of arrow 8B of FIG. 8A.

FIG. 10A is a plan view, FIG. 10B is a view seen from a direction of arrow 10B of FIG. 10A and FIG. 10C are a sectional view taken along the line 10C-10C of FIG. 10A.

DETAILED DESCRIPTION OF THE INVENTION

Hereafter, a preferred embodiment of the present invention will be explained based on attached drawings.

Figure 3A:
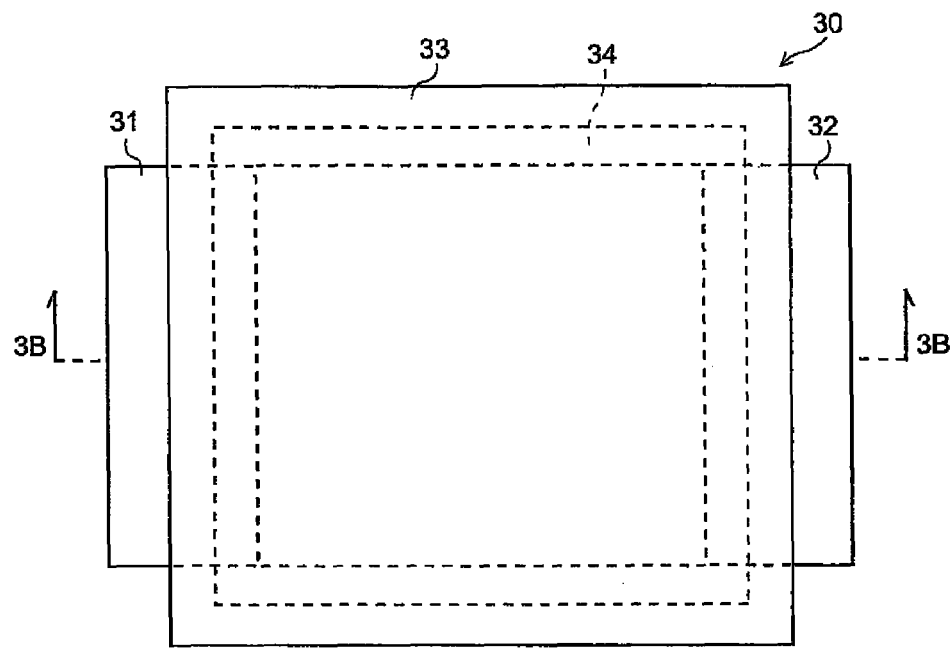
FIG. 3A and FIG. 3B are structural drawings of the molded product according to a preferred embodiment of the present invention.
Figure 3B:
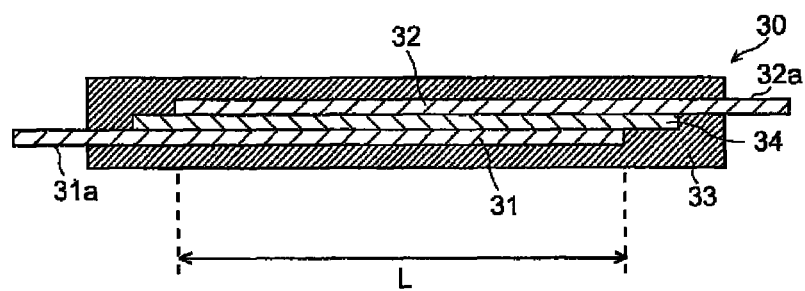

FIG. 3 is structural drawing of the molded product according to a preferred embodiment of the present invention. FIG. 3A is a plan view, and FIG. 3B is a sectional view taken along the line 3B-3B of FIG. 3A.

Surroundings of plural metal plates 31 and 32 (two metal plates in FIG. 3B) are covered with molded part 33 in a mold article according to this embodiment as shown in FIG. 3A and FIG. 3B.

Spacer polymer part 34 composed of insulating polymer of melting point T1 and adhesive of melting point T3 (T3<T1) is provided between metal plates 31 and 32. Surroundings of spacer polymer part 34 and metal plates 31 and 32 are covered with molded part 33 composed of insulating polymer of melting point (or softening point) T2 (<T1). Projection parts (terminal part) 31a and 32a projects from molded part 33.

A method of manufacturing a molded product according to this embodiment will be explained based on attached drawings.

Figure 1:
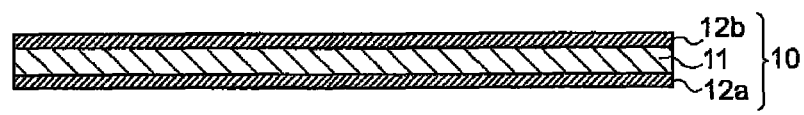
FIG. 1 is a sectional view of the spacer polymer sheet used for a manufacturing method of the molded product according to a preferred embodiment of the present invention.

First of all, as shown in FIG. 1, first bonding layers 12a, 12b composed of the adhesive whose melting point T3 is in the relation of T3<T1 are provided as one on the surface (upper and lower sides in FIG. 1) of first sheet material 11 composed of insulating polymer whose melting point is T1 to make spacer polymer sheet 10. Optionally, first bonding layer can be provided only on one side of first sheet material 11. Further, first bonding layer need not necessarily provide.

Figure 2:
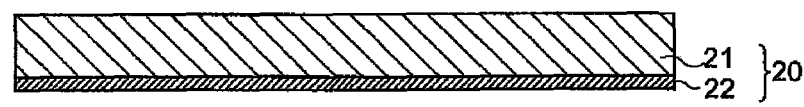
FIG. 2 is a sectional view of mold polymer sheet used for a manufacturing method of the molded product according to a preferred embodiment of the present invention.

On the other hand, as shown in FIG. 2, second bonding layer 22 composed of the adhesive whose melting point T3 is in the relation of T3<T1 is provided as one on the surface on metal body side (under face in FIG. 2) of second sheet material 21 composed of insulating polymer whose melting point is T2(<T1) to make mold polymer sheet 20. Further, the second bonding layer need not necessarily provide.

Figure 4:
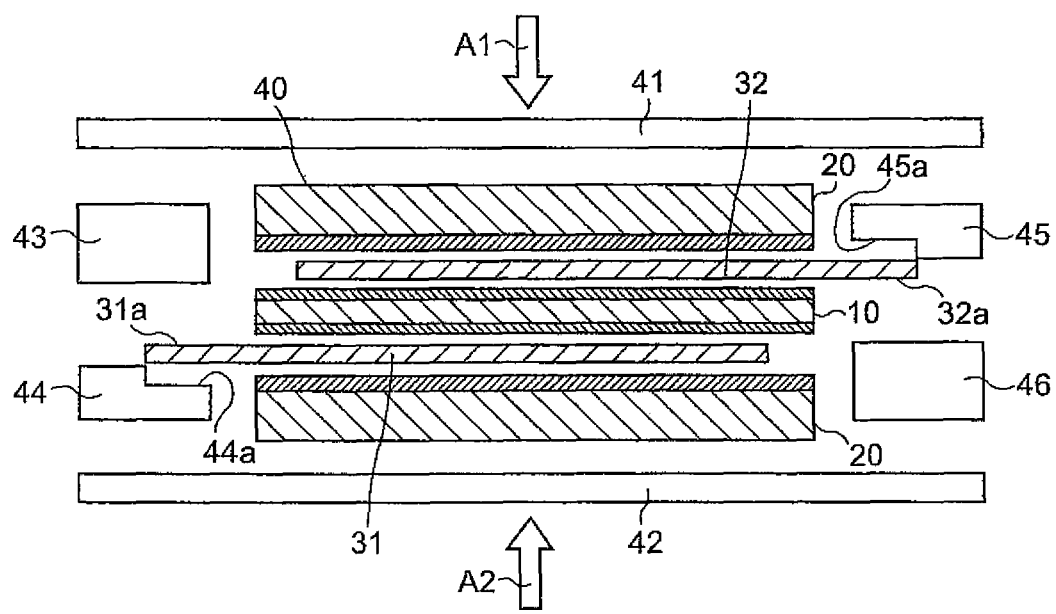
FIG. 4 is a view showing the lamination state of a laminate used to manufacture the molded product according to a preferred embodiment of the present invention.

Next, as shown in FIG. 4, laminate 40 is formed by placing spacer polymer sheet 10 between metal plates 31 and 32, and laminating mold polymer sheet 20 on metal plates 31 and 32 so that the surface of the side of second bonding layer 22 may contact the metal sheet. At this time, the lamination is performed so that a part of metal plates 31 and 32 may protrude beyond laminate 40. The points of metal plates 31 and 32 which protrude from laminate 40 become terminal parts 31a and 32a. Optionally, a plurality of spacer polymer sheets 10 can be placed between metal plates 31 and 32. The clearance between metal plates 31, 32 of molded product 30 described later can be freely adjusted by adjusting the number of spacer polymer sheets 10. When the number of metal plates is three sheets or more, mold polymer sheets 20 are arranged only outside of two outermost metal plates.

Figure 5:
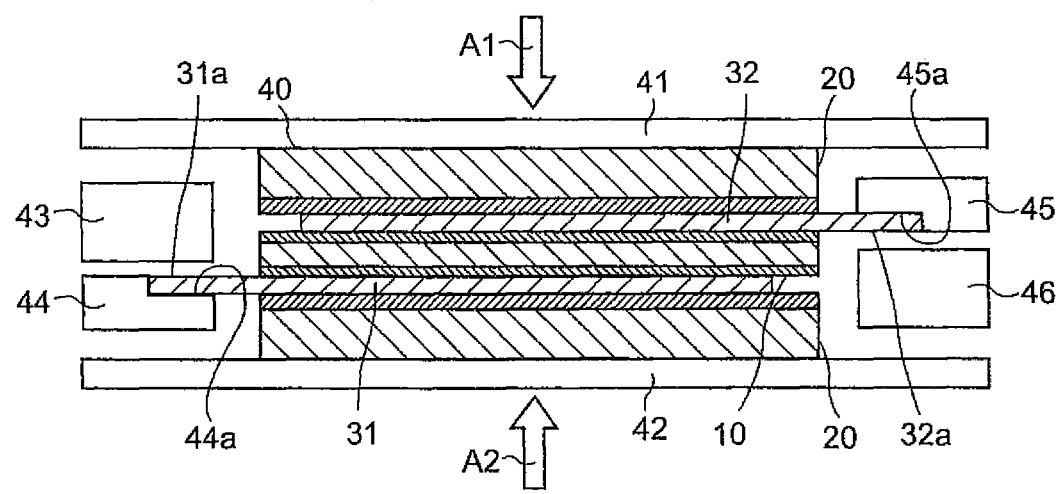
FIG. 5 is a view showing the state where the laminate of FIG. 4 is arranged between hot pressing plates of a hot pressing machine.

Laminate 40 is arranged between hot pressing plates 41 and 42 of the hot pressing machine. Terminal part 31a is supported by upper dies 43 and lower dies 44 as shown in the FIG. 5, and positioned on step part 44a of lower dies 44. Moreover, terminal part 32a is supported by upper dies 45 and lower dies 46, and positioned on step part 45a of upper dies 45. At least one of hot pressing plates 41 and 42 is connected with a cylinder etc. (not shown) of an oil pressure piston, and can move freely in directions of arrows A1 and A2, that is, in a direction where laminate 40 is compressed.

Next, the hot pressing mold is carried out to laminate 40 at a temperature higher than T2, but lower than T1. The pressure when the hot pressing mold is carried out is the pressure by which molten polymer 63 (described later), second sheet material 21 melted, can be transformed and drifted sufficiently, and is not limited to the specified value.

Figure 6:
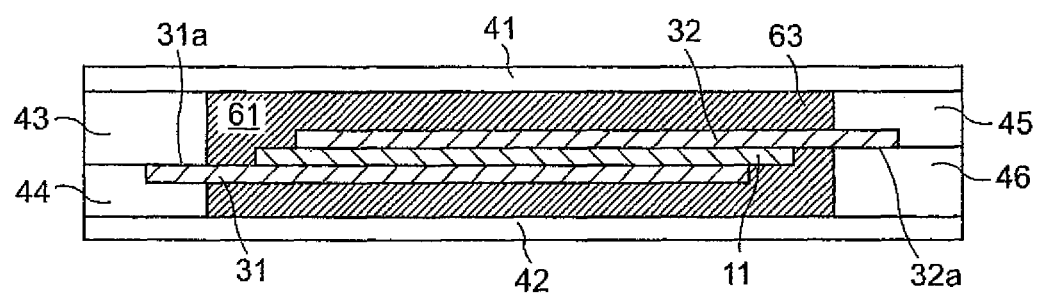
FIG. 6 is a view showing the state where the hot pressing mold was performed to the laminate of FIG. 5.

As shown in the FIG. 6, first sheet material 11 of spacer polymer sheet 10 is not melted when the hot pressing mold is carried out, and the shape is maintained. Therefore, the interval (clearance) corresponding to the thickness of first sheet material 11 can be almost secured between metal plates 31 and 32. Moreover, this clearance becomes uniform over the direction of the surface of metal plates 31 and 32. Further, second sheet material 21 of each mold polymer sheet 20 is melted by the hot pressing processing, and becomes molten polymer 63. This molten polymer 63 flows so as to bury space 61 formed by hot pressing plates 41, 42, dies 43, 44, and dies 45, 46. Moreover, each adhesive which composes first bonding layers 12a, 12b, and second bonding layers 22 is melted partially by the hot pressing processing because melting point T3 is less than T1 as well as T2, and flowed along with molten polymer 63. Temperature T3 can be either one of T3≤T2 and T3≥T2.

Figure 7:
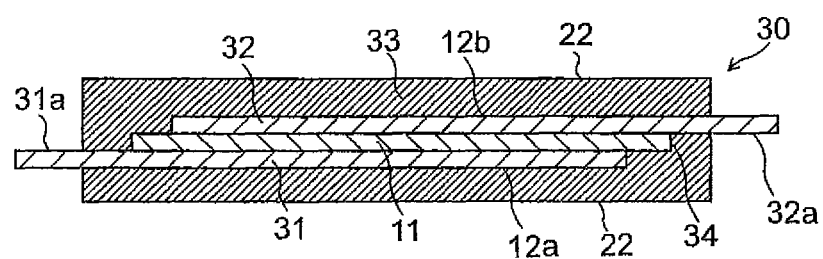
FIG. 7 is a sectional view of a first modification of FIG. 6.

Metal plate article 30 shown in FIG. 7 is obtained by molten polymer 63 spread in space 61 being cooled, and being solidified. First sheet material 11 and each of metal plates 31, 32 are bonded through remaining first bonding layers 12a and 12b. Moreover, the major part of molding sides (under face in FIG. 7) of metal plate 31 and molded part 33, and the major part of molding sides (top face in FIG. 7) of metal plate 32 and molded part 33 are bonded through remaining second bonding layers 22. Spacer polymer part 34 comprises first sheet material 11 and remaining first bonding layers 12a and 12b. When the first bonding layer is not provided on first sheet material 11, the first sheet material itself becomes spacer polymer part 34.

Here, the manufacturing of molded product 30 comes to be easy and to stabilize as the difference between the melting point of insulating polymer whose melting point is T2 which composes first bonding layers 12a, 12b and that of insulating polymer whose melting point is T1 which composes second bonding layers 22 becomes large.

Polymer material which contains aromatic polymer as a principal ingredient is suitable for insulating polymer whose melting point is T1. Moreover, polymer material or various elastomers which contains polyolefine as a principal ingredient is suitable for insulating polymer whose melting point is T2. In a word, it is desirable that the first polymer which has first adhesion mechanism by which strong bonding for the aromatic polymer material is obtained is used for insulating polymer whose melting point is T1. On the other hand, it is desirable that the second polymer which has second adhesion mechanism by which strong bonding for the metallic material is obtained is used for insulating polymer whose melting point is T2. It is more desirable that each polymer has high compatibility. When second bonding layers 22 are provided on the sides of spacer polymer sheet 10 of metal plates 31, 32, first bonding layers 12a, 12b, and second bonding layers 22 are adjacent. At this time, first bonding layers 12a, 12b, and second bonding layers 22 are strongly bonded when first polymer and second polymer have high compatibility, and metal plates 31, 32, and first sheet material 11 can be bonded more strongly consequently.

In the first adhesion mechanism, styrenic elastomer (polymer) which has styren block with high compatibility with aromatic polymer is used as an adhesive. The styren block part and the aromatic polymer in the adhesive are melted into each other when the adhesive and the aromatic polymer material are heated and pressurized. As a result, the adhesive and the aromatic polymer material are bonded strongly. Here, the aromatic polymer means polymer which has an aromatic ring in the principal chain. For instance, polyphenylene ether (PPE), polyetherimide (PEI), polycarbonate (PC), polyether sulphone, polyimide, polyphenylene sulfide, polysulfone, polyether ether ketone, etc. can be used, but it is not limited to the above substances. On the other hand, as styrenic elastomer which has the styren block, styrene ethylene butylene styrene copolymer (SEBS), styrene ethylene propylene styrene copolymer (SEPS), triblock copolymer such as styrene butylene styrene copolymer (SBS), diblock copolymer such as styrene butadiene rubber hydrogenised can be used.

Moreover, in the second adhesion mechanism, the epoxy radical part or the acid radical part of polymer produces hydrogen bond with the water molecule or the oxide of the metal surface by using the acid-modified or epoxy-modified polymer as an adhesive. As a result, the adhesive and the metal are bonded strongly. Maleic acid modification in the acid modification of polymer is typical acid-modification. There are, for instance, elastomer polyethylene (PE) such as SBS, SEBS, polyisobutylene (PIB), etc. and polymer of olefinic system such as polypropylene as acid-denaturated polymer. On the other hand, there are substance obtained by changing the copolymer of polyethylene and polystyrene to glycidyl, and substance obtained by changing the copolymer of ethylene glycidyl methacrylate copolymer (EGMA) and polystyrene (PS) as polymer which has the epoxy radical.

Spacer polymer part 34 (see FIG. 3B) which is a thin insulating layer can be uniformly formed by coating molded part 33 with spacer polymer sheet 10 arranged between metal plates 31 and 32 according to a manufacturing method of a molded product according to this embodiment. In a word, it is possible to coat metal plates 31, 32 with molded part 33. Moreover, it is possible to insulate metal plates 31 and 32 through a thin, uniform insulating layer. The formation of this spacer polymer 34 is influenced by neither the size of the areas of metal plates 31 and 32 nor the size of the clearance between metal plates 31 and 32. Further, the thickness of spacer polymer 34, that is, the clearance between metal plates 31 and 32 is uniform in a direction of the surface of the metal plates.

Figure 11:
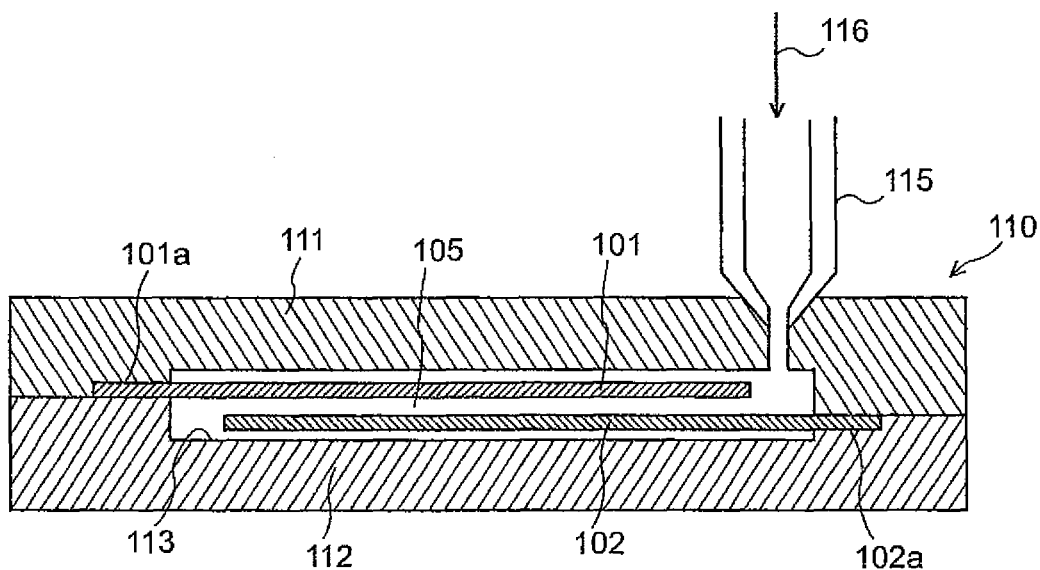
FIG. 11 is an explanatory drawing of the conventional manufacturing method of a molded product.

Moreover, molded part 33 and spacer polymer part 34 of the molded product according to this embodiment are formed not by the injection molding like the conventional manufacturing method shown in the FIG. 11 but by the hot pressing mold. In a word, molded part 33 and spacer polymer part 34 can be manufactured by using simple frame body composed of dies 43, 44, dies 45, 46 and hot pressing plates 41, 42 shown in FIG. 6. Namely, an expensive dies for an injection molding need not be used. Therefore, molded product 30 can be manufactured cheaply.

The shape and the thickness of second sheet material 21 used to manufacture molded product 30 according to this embodiment are adjusted for the volume to increase more than at least necessary amounts of the volume only by 10-40% in consideration of the volume of final molded part 33. In other words, the shape and the thickness of second sheet material 21 are adjusted so that the amount of the overflow of molten polymer 63 may be 10% to 40% of the actual amount of volume of molded part 33. The shape reproducibility of molded part 33 can be improved by taking the amount of the overflow of molten polymer 63 enough.

Moreover, when metal plates 31 and 32 are coated with molded part 33, the bond strength between metal plates 31, 32 and molded part 33, that is, the magnitude of peel strength between metal plates 31, 32 and molded part 33 becomes a main factor which determines the insulation performance of molded product 30. Therefore, metal plates 31, 32 and molded part 33 are bonded through the adhesive in molded product 30 according to this embodiment. Concretely, the bonding layers are formed on the surfaces of first sheet material 11 and second sheet material 21, the surfaces of metal plates 31, 32 or the surfaces of first sheet material 11, second sheet material 21, and metal plates 31, 32 beforehand. As a result, metal plates 31, 32 and molded part 33 can be bonded uniformly and strongly. It is possible to maintain excellently the insulation performance of molded product 30 over a long period of time.

The bond strength of adhesive of insulating polymer whose melting point is T2 and metal plates 31, 32 can be freely adjusted by adjusting an amount of the acid modification (or, epoxy modification) of acid modification (or, epoxy modification) polymer. Moreover, the bond strength of adhesive of insulating polymer whose melting point is T1 and first sheet material 11 can be freely adjusted by adjusting an amount of the styrene in the styren block part of styrenic elastomer.

For instance, molded product 30 according to this embodiment is suitable for a mold type power supply bus bar.

Figure 8A:
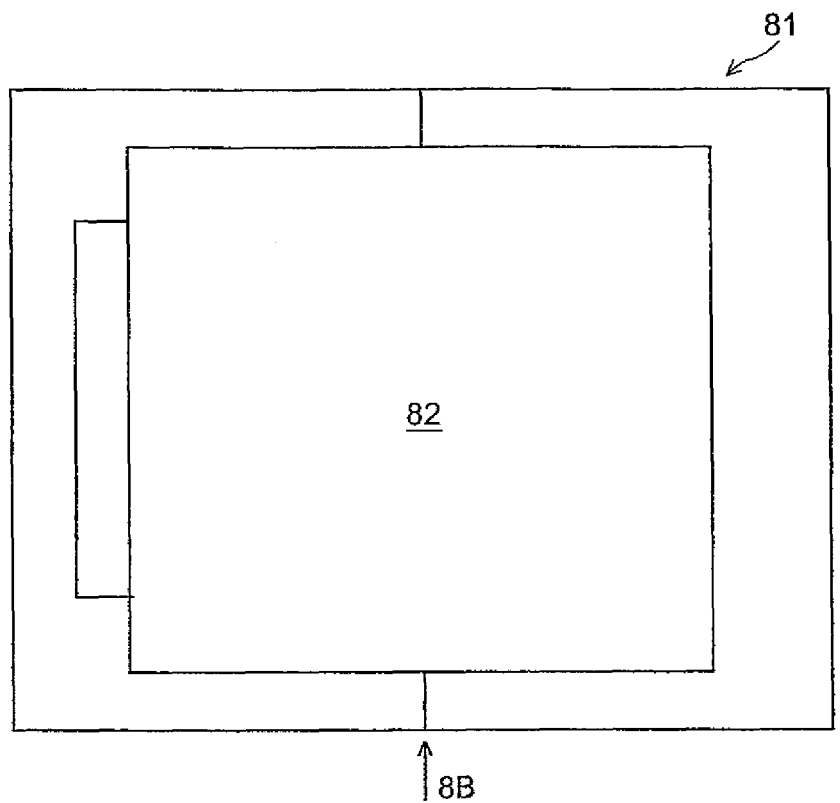
FIG. 8A and FIG. 8B are views showing the modification of the frame body used for a manufacturing method of the molded product according to a preferred embodiment of the present invention.
Figure 8B:
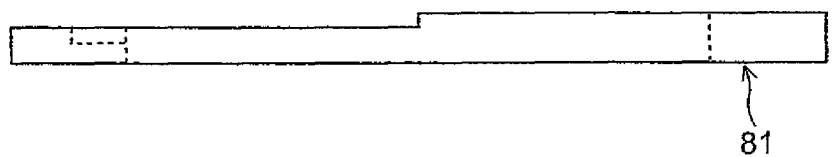

Further, although molded part 33 is formed by using frame body composed by hot pressing plates 41, 42, dies 43, 44, and dies 45, 46 in this embodiment as shown in FIG. 6, the present invention is not limited to such structure. Optionally, it is possible to form molded part 33 by using lower metal frame 81 and upper metal frame (not shown) shown in FIG. 8A and FIG. 8B as a frame body. Lower metal frame 81 corresponds to the one that hot pressing plate 42, and lower dies 44, 46 are integrated, and mold polymer sheet 20, metal plate 31, and spacer polymer sheet 10 are accommodated in space part 82 of lower metal frame 81. On the other hand, upper metal frame corresponds to the one that hot pressing plate 41 and upper dies 43, 45 are integrated, and metal plate 32 and mold polymer sheet 20 are accommodated in the space part of the upper metal frame.

Next, another embodiment of the present invention will be explained with reference to attached drawings.

In the manufacturing method of a molded product according to the above-mentioned embodiment, the molded part is formed by the hot pressing process. On the other hand, the molded part is formed by an injection molding process in the manufacturing method of a molded product according to this embodiment.

Concretely, spacer polymer sheet 10 is made by providing first bonding layers 12a, 12b composed of the adhesive whose melting point T3 is in the relation of T3<T1 on the surfaces (upper and lower surfaces in FIG. 1) of first sheet material 11 composed of insulating polymer whose melting point is T1 first shown in FIG. 1.

Figure 9:
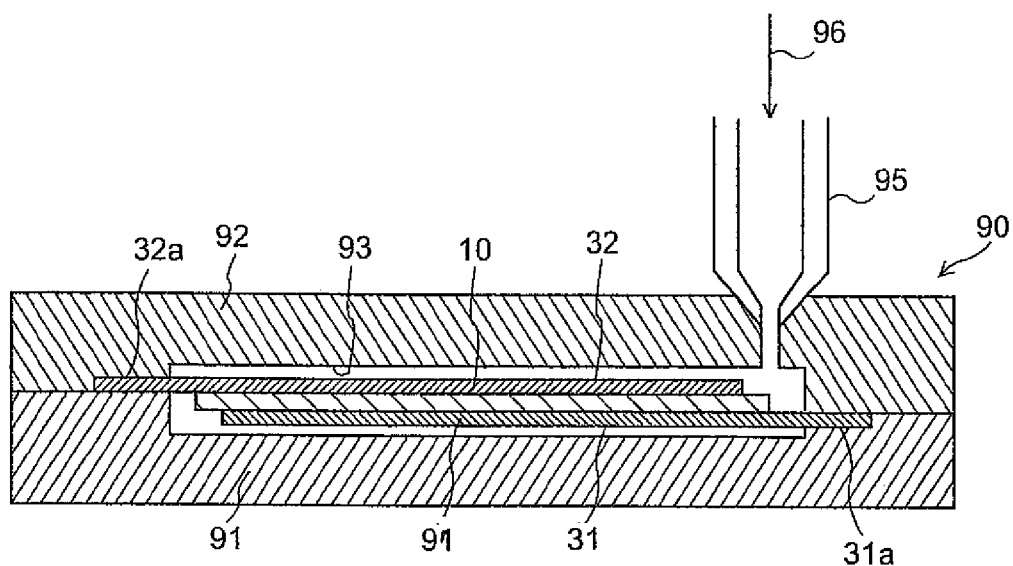
FIG. 9 is an explanatory drawing of a manufacturing method of the molded product according to another preferred embodiment of the present invention.
Figure 10:
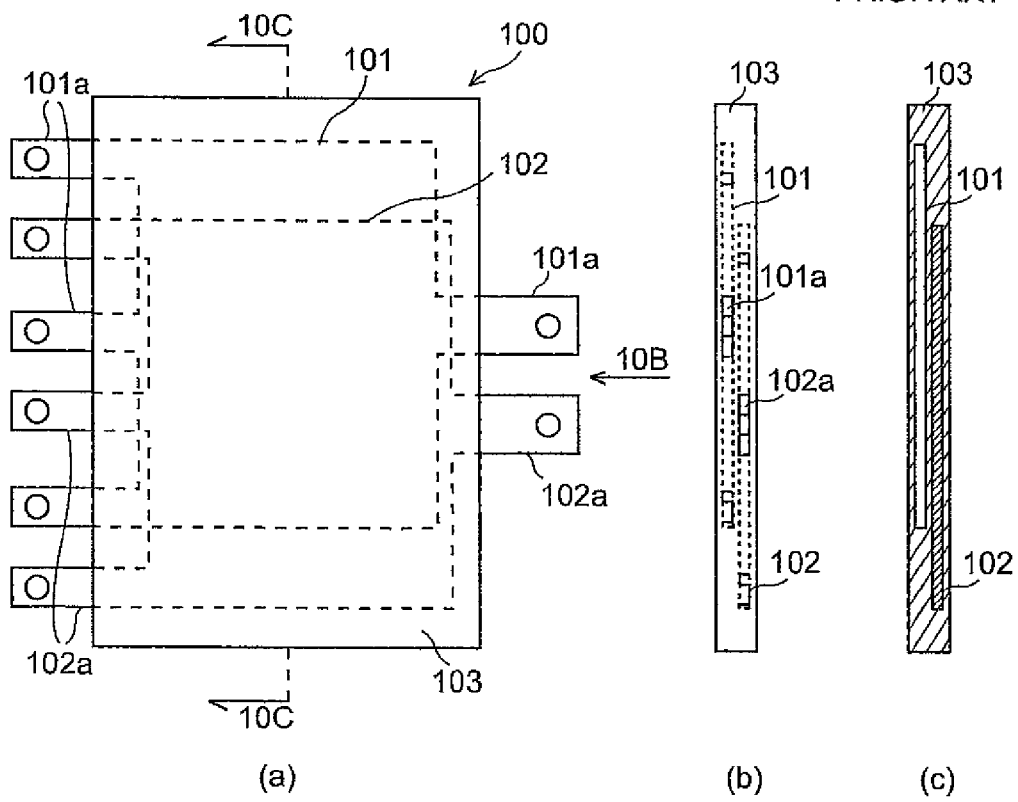
FIG. 10A, FIG. 10B and FIG. 10C are structural drawings of a general bus bar.

Next, laminate 97 shown in FIG. 9 is formed by placing spacer polymer sheet 10 between metal plated 31 and 32 and laminating them. At this time, the lamination is performed so that a part of metal plates 31, 32 may protrude beyond the laminate 97. Points of metal plates 31, 32 which protrude beyond laminate 97 forms terminal parts 31a, 32a. Further, optionally, it is possible to place a plurality of spacer polymer sheets 10 between metal plates 31 and 32. The clearance between metal plates 31 and 32 as described later can be freely adjusted by adjusting the number of spacer polymer sheets 10 to be placed.

After laminate 97 is arranged between hot pressing plates of the hot pressing molding machine, the heating processing is carried out. As a result, first bonding layers 12a, 12b is melted, and metal plates 31, 32 and first sheet material 11 are bonded through first bonding layers 12a, 12b. Then, bonded laminate 97 is set in cavity 93 of injection molding dies 90. Metal plates 31 and 32 are fixed in cavity 93 with terminal parts 31a, 32a placed between upper dies 92 and lower dies 91. Then, molten polymer 96 is supplied to cavity 93 from at least one injection head 95 connected fluidly to cavity 93. Molten polymer 96 is the polymer made by heating insulating polymer whose melting point is T2 (<T1) at a temperature higher than T2 but lower than T1 and melting it.

First sheet material 11 of spacer polymer sheet 10 does not melt at this injection molding processing, and thus its shape is maintained. Therefore, the interval (clearance) for the thickness of first sheet material 11 is almost secured between metal plates 31 and 32. This clearance becomes uniform over a direction of the surfaces of metal plates 31, 32. Further, molten polymer 96 flows so as to fill in the space of cavity 93. Moreover, a part of the adhesive which composes first bonding layers 12a, 12b melts by the temperature at the injection molding processing because melting point T3 is in the relation of T3<T1, and flows along with molten polymer 96.

Molded product 30 (refer to FIG. 3) in which surroundings of metal plates 31, 32 and first sheet material 11 are covered with molded part 33 is obtained by molten polymer 96 spread in cavity 93 being cooled, and being solidified. First sheet material 11 and metal plates 31, 32 are bonded through remaining first bonding layers 12a, 12b.

Because in the manufacturing method of a molded product according to this embodiment, the molded part is formed by an injection molding process, an expensive injection molding dies is needed, differing from the manufacturing method of a molded product according to the above-mentioned embodiment. However, because in the manufacturing method of a molded product according to this embodiment, the mold coating is performed to laminate 90 of at least three-layer structure, mold polymer sheet 20 shown in FIG. 2 is not needed. Therefore, the formation process of the laminate can be simplified compared with the manufacturing method of a molded product according to the previous embodiment in which laminate 40 of at least five layer-structure is coated with molding material.

EMBODIMENT

Two sheet of coppers (200 mm×280 mm and thickness t is 1 mm) were prepared as a metal plate. Lap width L was 210 mm and the clearance between sheet coppers was 0.4 mm as shown in FIG. 3B, and the molding area (240 mm×250 mm) which includes the lap area was coated with molding.
(Embodiment 1)

PPE sheet (Asahi Kasei Corporation, Zairon 540Z, and thickness t is 0.4 mm) where the heat-hardening bonding layer had been spread on both sides as shown in FIG. 1 was prepared. The sheet was cut into the size (220 mm×230 mm) whose length and breadth is 10 mm larger than the lap area of two sheet coppers. Moreover, flame-resistant PE resin sheet (UBE INDUSTRIES, LTD. Z555, and thickness t is 2.5 mm) which the hot melt adhesive layer was spread on one side as shown in FIG. 2 was prepared. The flame-resistant PE resin sheet was cut (220 mm×230 mm×2.5 mm) so that the volume of two flame-resistant PE resin sheet may become more than the value obtained by subtracting the volume of the sheet copper and the PPE sheet from the volume of the molded product of 240 mm×250 mm×5 km. Further, a frame body composed of lower metal frame 81 shown in FIG. 8 and an upper metal frame which makes couple with lower metal frame 81 was prepared.

The laminate piled up in order of a flame-resistant PE resin sheet, a resin sheet, a PPE sheet, a sheet copper, and a flame-resistant PE resin sheet was arranged in this frame body. This laminate was placed between hot pressing plates together with the frame body, and it was set in hot pressing molding machine heated to 130° C. The pressure of 0.5 MPa was applied after preheating enough, and the hot pressing processing was carried out. As a result, the molded product (sample 1) which has the structure shown in FIG. 7 was obtained.

As a result, in sample 1, a very thin and uniform insulating layer (spacer polymer) was formed between sheet coppers of 0.4 mm in the clearance and 200 mm in one side. Partial discharge generation disappearance (10 pC) voltage in sample 1 was measured, and the value of 8 kV or more was obtained. Moreover, the void which affects negatively on electrical insulation did not generate between sheet coppers of this molded product and around the sheet copper.

Moreover, the partial discharge generation disappearance voltage was measured again after heat cycle of −25° C. to 105° C. was repeated 100 times to this sample 1, and the same value of 8 kV or more as one before providing the heat cycle were obtained. In a word, it was confirmed that even if the heat cycle is added, the void and flaking off are not occurred on the interface of the sheet copper and the PPE sheet, and the sheet copper and the PPE sheet are strongly bonded.
(Embodiment 2)

The same PPE sheet as embodiment 1 was made. Moreover, injection molding dies 90 shown in FIG. 9 as a frame body was prepared.

The laminate piled up in order of a sheet copper, a PPE sheet and a sheet copper was placed between hot pressing plates of a hot pressing molding machine, and heated to 130° C. The bonding layer in the PPE sheet melted by this heating processing, and the sheet copper and the PPE sheet were bonded through the bonding layer. The injection molding processing was carried out by injecting the flame-resistant PE resin melted after having arranged this laminate in cavity 93 of injection molding dies 90. Thereby, the molded product (sample 2) which has the structure shown in the FIG. 7 was produced.

As a result, in sample 2, a very thin and uniform insulating layer (spacer polymer) was formed between sheet coppers of 0.4 mm in the clearance and 200 mm in one side. Partial discharge generation disappearance (10 pC) voltage in sample 2 was measured, and the value of 8 kV or more was obtained. Moreover, the void which affects negatively on electrical insulation did not generate between sheet coppers of this molded product and around the sheet copper.

Moreover, the partial discharge generation disappearance voltage was measured again after heat cycle of −25° C. to 105° C. was repeated 100 times to this sample 2, and the same value of 8 kV or more as one before providing the heat cycle were obtained. In a word, it was confirmed that even if the heat cycle is added, the void and flaking off are not occurred on the interface of the sheet copper and the PPE sheet, and the sheet copper and the PPE sheet are strongly bonded.

COMPARISON EXAMPLE 1 injection molding dies 110 shown in FIG. 11 as a frame body was prepared.

The injection molding processing was carried out by injecting polyphenyl ether (PPE, Asahi Kasei Corporation, Zairon 540Z) melted after arranging the sheet copper in cavity 113 of injection mold 110 in cavity 113, and the molded product (sample 3) was made.

Partial discharge generation disappearance (10 pC) voltage in sample 3 was measured, and the very low value less than 1 kV or more was obtained. This molded product was cut, and the section was observed. As a result, it was confirmed that the void which affects negatively on electrical insulation had generated between sheet coppers.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A method of manufacturing a molded product, in which surroundings of metal plates spaced at specified intervals are covered with insulating polymer to insulate them electrically, comprising the steps of:
    arranging a spacer polymer part between the metal plates spaced at specified intervals, the spacer polymer part comprising a first sheet material composed of aromatic polymer and first bonding layers composed of a styrenic elastomer having a styrene block between which the first sheet material is provided,
    arranging mold polymer parts outside of outermost ones of the metal plates, each of the mold polymer parts comprising a second sheet material composed of insulating polymer and a second bonding layer composed of acid-modified polymer or epoxy-modified polymer in contact with respective outermost ones of the metal plates,
    hot-pressing molding a laminate of the metal plates, the spacer polymer part, and the mold polymer parts at a temperature higher than a melting point of each of the first bonding layers, the second bonding layers and the second sheet materials but lower than a melting point of the first sheet material, thereby melting the second sheet materials while securing the interval between the metal plates by the first sheet material, and covering the surroundings of the metal plates and the first sheet material with molded insulating polymer.

2. The method of manufacturing a molded product according to claim 1, wherein a plurality of said first sheet materials are arranged between the metal plates.

3. The method of manufacturing a molded product according to claim 1, wherein the volume of the second sheet materials before melting the second sheet materials is more than a value obtained by subtracting the volume of the metal plates and the first sheet material from the volume of the molded product.

4. The method of manufacturing a molded product according to claim 1, wherein the aromatic polymer is selected from the group consisting of polyphenylene ether (PPE), polyetherimide (PEI), polycarbonate (PC), polyether sulphone, polyimide, polyphenylene sulfide, polysulfone and polyether ether ketone.

5. The method of manufacturing a molded product according to claim 1, wherein the styrenic elastomer having a styrene block is selected from the group consisting of styrene ethylene butylene styrene copolymer (SEBS), styrene ethylene propylene styrene copolymer (SEPS), styrene butylene styrene copolymer (SBS) and styrene butadiene rubber hydrogenised.

\* \* \* \* \*